(12) United States Patent
Cheng et al.

(10) Patent No.: US 11,467,635 B2
(45) Date of Patent: Oct. 11, 2022

(54) STORAGE PROCESSOR AND STORAGE SYSTEM

(71) Applicant: EMC IP Holding Company LLC, Hopkinton, MA (US)

(72) Inventors: Jesse Cheng, Shanghai (CN); Adam Yu, Shanghai (CN); Ricky Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 929 days.

(21) Appl. No.: 16/171,921

(22) Filed: Oct. 26, 2018

(65) Prior Publication Data

US 2019/0129478 A1 May 2, 2019

(51) Int. Cl.
*G06F 1/18* (2006.01)
*G06F 1/26* (2006.01)
*H02H 5/12* (2006.01)

(52) U.S. Cl.
CPC .............. *G06F 1/182* (2013.01); *G06F 1/263* (2013.01); *H02H 5/12* (2013.01)

(58) Field of Classification Search
CPC .......... G06F 1/182; G06F 1/263; G06F 1/187; G06F 3/06; G06F 1/30; H02H 5/12
See application file for complete search history.

(56) References Cited

U.S. PATENT DOCUMENTS

| | | | |
|---|---|---|---|
| 6,292,898 B1* | 9/2001 | Sutherland | G06F 21/87 713/193 |
| 6,795,926 B1* | 9/2004 | Matula | G06F 1/3203 713/300 |
| 9,740,638 B2* | 8/2017 | Hyde | G06F 21/00 |
| 2011/0050438 A1* | 3/2011 | Kadathur | G06F 11/3055 340/815.45 |

* cited by examiner

*Primary Examiner* — Chun Cao
(74) *Attorney, Agent, or Firm* — Krishnendu Gupta; Nikhil Patel (57) ABSTRACT

Embodiments of the present disclosure relate to storage processor and storage system. A storage processor comprises a housing provided with a cover and a main power supply input, which, for example, connects an external power source to supply power to the storage processor. A battery is disposed within the housing and configured to continue supplying power to the storage processor in response to the main power supply input being cut off. A protection device is disposed within the housing and configured to disable the battery to supply power to the storage processor in response to determining that the cover is opened.

11 Claims, 6 Drawing Sheets

STORAGE PROCESSOR AND STORAGE SYSTEM

RELATED APPLICATIONS

This application claim priority from Chinese Patent Application Number CN 2017/1023494.5, filed on Oct. 27, 2017 at the State Intellectual Property Office, China, titled "STORAGE PROCESSOR AND STORAGE SYSTEM" the contents of which is herein incorporated by reference in its entirety.

FIELD

Embodiments of the present disclosure generally relate to the field of storage, and more specifically, to storage processor and storage system.

BACKGROUND

At present, many storage system products have realized data vault function. For example, when the power grid fails, a storage system backs up data in a Central Processing Unit (CPU) and volatile memories such as cache to the non-volatile memory, to ensure that no data will be missing. To address this problem, one battery or battery pack can be embedded in each storage processor to supply power for the storage processor during system blackout.

Vault in hand function can be implemented by embedding the battery in the storage processor. For example, when a user removes a storage processor from a chassis for maintenance, the storage processor writes data stored in the volatile memory into the non-volatile memory to avoid data missing. Thus, the user can directly maintain the storage system without assistance from the support staff of the device provider, so as to lower the maintenance costs. However, since the user may lack sufficient knowledge about the storage processor and the storage system, potential safety issues may rise.

SUMMARY

Embodiments of the present disclosure provide a protection solution for reducing the risks of the safety issues.

According to a first aspect of the present disclosure, there is provided a storage processor. The storage processor comprises a housing provided with a cover and a main power supply input, which, for example, connects an external power source to supply power for the storage processor. A battery is disposed within the housing and configured to continue supplying power to the storage processor in response to the main power supply input being cut off. A protection device is disposed within the housing and configured to disable the battery to supply power to the storage processor in response to determining that the cover is opened.

According to a second aspect of the present disclosure, there is provided a storage system. The storage system comprises a chassis and one or more storage processors according to the first aspect of the present disclosure disposed on the chassis.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objects, features, and advantages of the present disclosure will become more apparent, wherein the same reference sign usually refers to the same component in the example embodiments of the present disclosure.

DETAILED DESCRIPTION OF EMBODIMENTS

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

As described above, when a user removes a storage processor from a chassis, a main power source for supplying power to the storage processor is cut off. At this moment, a battery of the storage processor is enabled to continue supplying power to the storage processor, so as to perform data vault. If the storage processor is maintained, a cover of the storage processor is required to be opened. At this point, electrical power over 240 VA (volt-ampere) may be exposed to harm the user's body.

To at least partially solve the above problem and/or other potential problems, example embodiments of the present disclosure provide a protection device for a storage processor 100 to lower risks of such harm.

Figure 1:
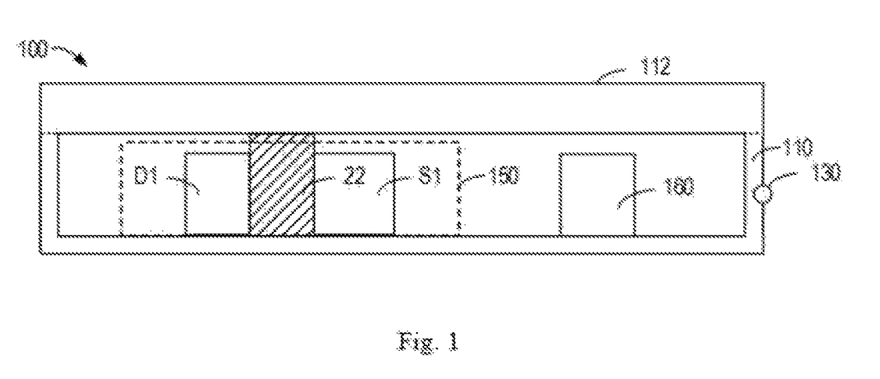
FIG. 1 is a schematic cross sectional diagram illustrating a storage processor according to one embodiment of the present disclosure.
Figure 2:
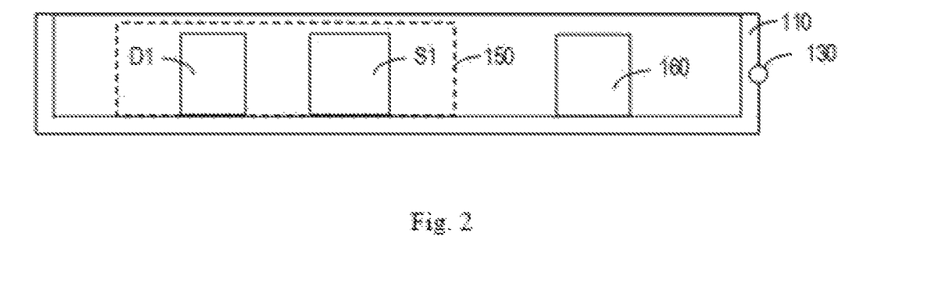
FIG. 2 is a schematic cross sectional diagram illustrating the storage processor as shown in FIG. 1 with a cover being removed.

FIG. 1 is a schematic cross sectional diagram illustrating a storage processor 100 according to one embodiment of the present disclosure. The storage processor 100 may be a Field Replaceable Unit (FRU) that supports the vault in hand function. The storage processor 100 may include components such as one or more processors, one or more volatile memories, and one or more non-volatile memories, which may be disposed on a substrate or baseboard. The non-volatile memories may be SATA or m.2 non-volatile memories for transferring data here during data vault. As shown in FIG. 1, the storage processor 100 includes a housing 110 provided with a cover 112 thereon. FIG. 2 is a schematic cross sectional diagram illustrating the embodiment of the storage processor 100 as shown in FIG. 1 after the cover 112 is removed.

As shown in FIGS. 1-2, the storage processor 100 includes a main power supply input 130 to be connected to an external power source to supply power to the storage processor 100. For example, the external power source may be an alternating-current (AC) power grid. The storage processor 100 further includes a battery 160, which is disposed within the housing 100 and may continue supplying power to the storage processor 100 when the main power supply input 130 is cut off. The battery 160 may be a Battery-on-Bus (BoB), where the bus may represent a power supply bus of 12 volts.

The storage processor 100 further includes a protection device 150 disposed within the housing 110. The protection device 150 disables the battery 160 from supplying power to the storage processor 100 if it is determined that the cover 112 is opened. In this case, maintenance personnel such as the user may be protected from being harmed by electric shock or the like.

In some embodiments, the protection device 150 may include a light emitting device D1, which is turned on when the storage processor 100 is powered. For example, the light emitting device D1 may be powered by the external power source from the main power supply input 130 or the battery 160. The light emitting device D1 may be a light-emitting diode. As shown in FIGS. 1-2, the protection device 150 further includes a sensor S1. If the sensor S1 senses the light emitted by the light emitting device D1, the sensor S1 may output at the output terminal a first signal indicating that the cover 112 is opened.

In some embodiments, the cover 112 may further include a shield 22. As shown in FIG. 1, if the cover 112 is closed, the shield 22 is disposed between the light emitting device D1 and the sensor S1 to block the light emitted by the light emitting device D1 from reaching the sensor S1. As shown in FIG. 2, if the cover 112 is opened, the shield 22 is removed from between the light emitting device D1 and the sensor S1, such that the light emitted by the light emitting device D1 can reach the sensor S1.

Figure 3:
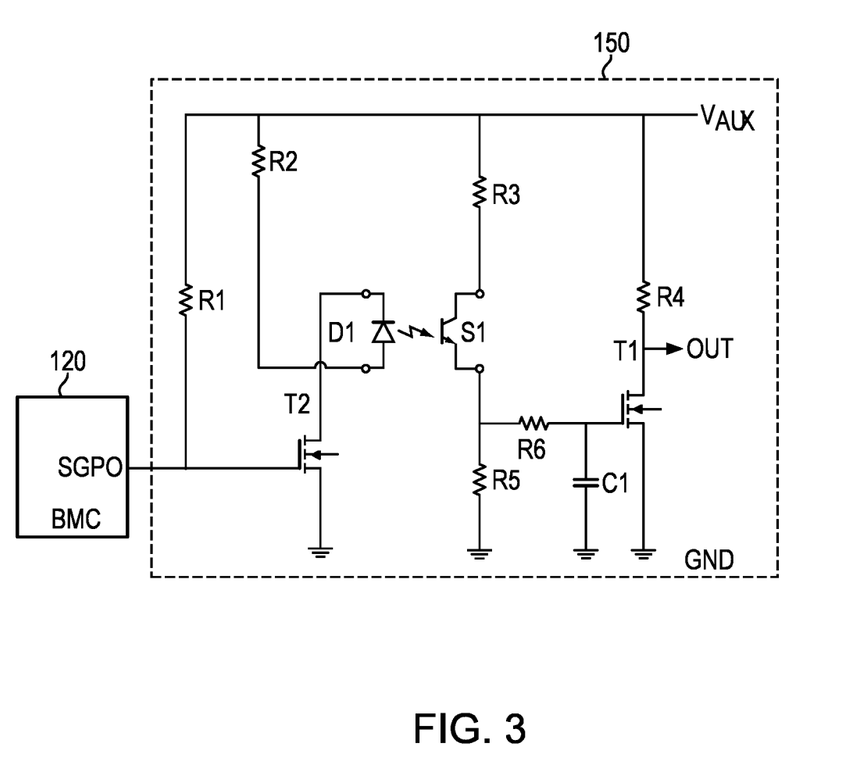
FIG. 3 is a related circuit diagram of a protection device according to one embodiment of the present disclosure.

FIG. 3 is a related circuit diagram of the protection device 150 according to one embodiment of the present disclosure. The protection device 150 is connected to a supply voltage $V_{AUX}$, which, for instance, may be provided by the battery 160. For example, a Low Dropout Regulator (LDO) can be employed to reduce the 12V bus voltage of the battery 160 to 3.3V, so as to provide the supply voltage $V_{AUX}$. The light emitting device D1 may be coupled between the supply voltage $V_{AUX}$ and a reference voltage, which may be the ground voltage GND. A resistor R2 may be connected in series with the light emitting device D1 to protect the light emitting device D1. The resistor R2, for example, may have a resistance value of about 100 ohms.

As shown in FIG. 3, the protection device 150 includes a first switch T1 coupled between the supply voltage $V_{AUX}$ and the reference voltage. The first switch T1 includes a control terminal coupled to the output terminal of the sensor S1 and an output terminal coupled to the supply voltage $V_{AUX}$. The first switch T1 may be a Metal-Oxide Semiconductor Field Effect Transistor (MOSFET) and the control terminal of the first switch T1 is the gate of the MOSFET. It should be understood that the first switch T1 may also be implemented by other types of switches and the embodiments of the present disclosure are not limited in this regard. The first switch T1 couples the output terminal OUT of the first switch T1 to the reference voltage to output a second signal for disabling the battery 160, in response to receiving the first signal from the sensor S1 at the control terminal.

As shown in FIG. 3, the protection device 150 further includes a resistor R4 (also referred to as a pull-up resistor), which is connected between the supply voltage $V_{AUX}$ and the output terminal OUT of the first switch T1. If the first switch T1 is turned on, the output terminal of the first switch T1 will be coupled to the reference voltage to output the second signal; if the first switch T1 is turned off, the output terminal of the first switch T1 will be pulled up to the supply voltage $V_{AUX}$ by the resistor R4, to output a third signal for enabling the battery 160.

In some embodiments, the sensor S1 may be a phototransistor coupled between the supply voltage $V_{AUX}$ and the reference voltage. Or more generally, the sensor S1 may be an optical sensor or a photosensitive switch. The protection device 150 may further include a resistor R5 (also referred to as a pull-down resistor) coupled between an output terminal of the phototransistor and the control terminal of the first switch T1 and the reference voltage. If the phototransistor is turned on, the phototransistor will couple the control terminal of the first switch T1 to the supply voltage $V_{AUX}$ to turn on the first switch T1.

Optionally, a resistor R3 may be connected between the phototransistor and the supply voltage $V_{AUX}$. The resistor R3 may have a smaller resistance value than the resistor R5, such that the voltage at the output terminal of the phototransistor substantially equals to the supply voltage $V_{AUX}$ when the phototransistor is turned on. In some embodiments, the resistor R3 may also be omitted.

As shown in FIG. 3, the storage processor 100 may further include a Baseboard Management Controller BMC 120. The BMC 120 may be a microcontroller, which may be embedded on the substrate or baseboard of the storage processor for managing an interface between the environment management software and the hardware. As shown in FIG. 3, the BMC 120 includes an output terminal, which may be a General Purpose Input/Output (GPIO) port for outputting a fourth signal for selectively enabling or disabling the protection device 150.

The protection device 150 may further include a second switch T2 having a control terminal coupled to the GPIO port of the BMC 120 and an output terminal coupled to the light emitting device D1. The second switch T2 may be a MOSFET or another switching device. The second switch T2 selectively supplies power to the light emitting device D1 based on the fourth signal from the GPIO port. For example, when the fourth signal is at a high level, the second switch T2 will be turned on, so as to supply power to the light emitting device D1. When the fourth signal is at a low level, the second switch T2 will be turned off to stop supplying power to the light emitting device D1.

The GPIO port is connected via the resistor R1 to the supply voltage $V_{AUX}$ and provides a high level signal to the second switch T2 by default, so as to cause the second switch T2 to be in an ON-state. In such case, the light emitting device D1 is turned on to emit light. In this way, the above protection function is enabled. However, because the above protection function might be disabled when the system is being debugged or the maintenance personnel is well familiar with system risks, a low level signal may be outputted from the GPIO port at this time, so as to turn off the second switch T2 and stop the light emitting device D1 from lightening. In this way, the battery 160 will not be disabled even if the cover 112 is opened.

Moreover, the protection device 150 may further include a resistor R6 coupled between the output terminal of the sensor S1 and the control terminal of the first switch T1 for improving stability of operation of the first switch T1. The resistor R6 may have a relatively small resistance value, such as 49.9 ohms. In addition, a capacitor C1 may be connected between the gate and the source of the first switch T1 for improving circuit performance. For example, the capacitance value of the capacitor C1 may be 1 μF.

Figure 4:
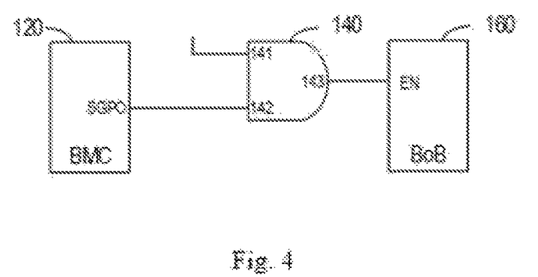
FIG. 4 is a related circuit diagram of a protection device according to one embodiment of the present disclosure.

FIG. 4 is a related circuit diagram of the protection device 150 according to one embodiment of the present disclosure. Additionally or alternatively, compared with the BMC 120 in FIG. 3, the BMC 120 in the embodiment as shown in FIG. 4 may include another output terminal, for example, a Serial General Purpose Output (SGPO) port. If it is determined that the capacity of the battery 160 is greater than a predetermined threshold, the SGPO port will output a fifth signal at a high level. For example, when the main power supply input 130 receives electrical power from the external power source, the SGPO port may still output the fifth signal, so as to enable the battery 160. In this way, it is ensured that the battery 160 may be directly used to supply power without losing any data when the external power source fails, for example.

As shown in FIG. 4, an AND gate includes a first input terminal 141, a second input terminal 142, and an output terminal 143. The first input terminal 141, for example, may be coupled to the output terminal of the first switch T1. The second input terminal 142 is coupled to the output terminal SGPO of the BMC 120 for receiving the fifth signal. The output terminal 143 is coupled to an enable port EN of the battery 160 to selectively enable or disable the battery 160. For example, when the output terminal 143 outputs a high level signal, the battery 160 is enabled; however, when the output terminal 143 outputs a low level signal, the battery 160 is disabled.

Figure 5:
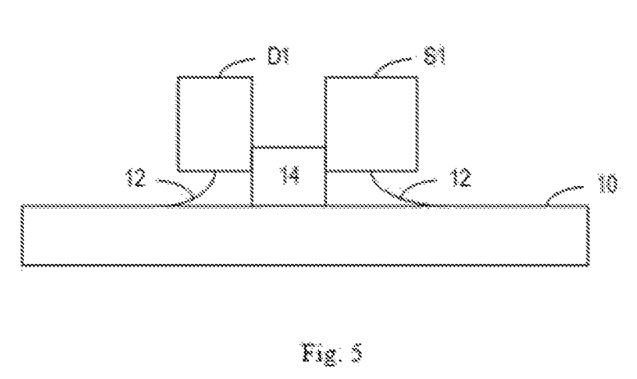
FIG. 5 is a schematic cross sectional diagram illustrating a detection circuitry of a protection device according to one embodiment of the present disclosure.

FIG. 5 is a schematic sectional diagram illustrating a detection circuitry according to one embodiment of the present disclosure. The detection circuitry includes a light emitting device D1, a sensor S1, a connecting structure 14, and leads 12. The connecting structure 14 is disposed between the light emitting device D1 and the sensor S1 to integrate the two together. The leads 12 may connect the light emitting device D1 and the sensor S1 to the underlying substrate or baseboard 10, so as to be interconnected with other components of the protection device 150.

Figure 6:
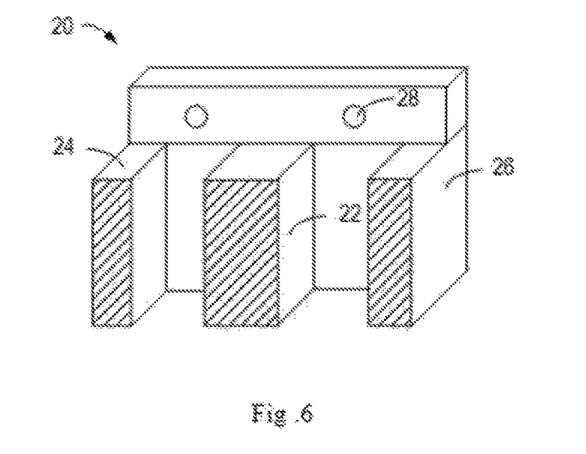
FIG. 6 is a schematic diagram illustrating a shield assembly according to one embodiment of the present disclosure.

FIG. 6 is a schematic diagram illustrating a shield assembly 20 according to one embodiment of the present disclosure. The shield assembly 20 includes the shield 22 as described above, and a fixture 28 that fixates the shield assembly 20 onto the cover 112. As shown in FIG. 6, the fixture 28 may be a screw hole to mate with a bolt to fixate the shield assembly 20 onto the cover 112. The shield assembly 20 may further include protective plates 24 and 26 for protecting the light emitting device D1 and the sensor S1.

Specific examples of the detection circuitry and the shield assembly 20 have been described above with respect to FIGS. 5 and 6 respectively. It should be appreciated that the detection circuitry and the shield assembly according to embodiments of the present disclosure may be implemented using any other suitable physical structures and/or arrangements and the above description is provided only for the purpose of illustration rather than limitation.

Various embodiments of the present disclosure have been described above and the above description is only exemplary rather than exhaustive and is not limited to the embodiments disclosed herein. Many modifications and alterations, without departing from the scope and spirit of the explained various embodiments, are obvious for those ordinary skilled in the art. The selection of terms in the text aims to best explain principles and actual applications of each embodiment and improvements to the technology in the market contributed by each embodiment, or enable those other ordinary skilled in the art to understand various embodiments disclosed herein.

We claim:

1. A storage processor (100), comprising:
    a housing (110) comprising a cover (112);
    a main power supply input (130) configured to be connected to an external power source to supply power to the storage processor (100);
    a battery (160) disposed within the housing (110) and configured to continue supplying power to the storage processor (100) in response to the main power supply input being cut off;
    a protection device (150) disposed within the housing (110) and configured to, in response to determining that the cover (112) is opened, disable the battery (160) to supply power to the storage processor (100); and
    a Baseboard Management Controller (BMC) (120) comprising an output terminal configured to output a fourth signal for selectively enabling or disabling the protection device (150), wherein the protection device (150) further comprises: a second switch (T2) having a control terminal coupled to the output terminal of the BMC (120) and an output terminal coupled to a light emitting device (D1) to selectively supply power to the light emitting device (D1) according to the fourth signal.

2. The storage processor (100) of claim 1, wherein the protection device (150) comprises:
    the light emitting device (D1) configured to emit light when the storage processor (100) is powered on; and
    a sensor (S1) configured to, in response to sensing the light emitted by the light emitting device (D1), output, at an output terminal, a first signal indicating that the cover (112) is opened.

3. The storage processor (100) of claim 2, wherein the cover (112) comprises a shield (22), the shield (22) being arranged to be disposed between the light emitting device (D1) and the sensor (S1) to block the light emitted by the light emitting device (D1) from reaching the sensor (S1) if the cover (112) is closed, and the shield (22) being arranged to be removed from between the light emitting device (D1) and the sensor (S1) such that the light emitted by the light emitting device (D1) can reach the sensor (S1) if the cover (112) is opened.

4. The storage processor (100) of claim 2, wherein the protection device (150) further comprises:
    a first switch (T1) coupled between a supply voltage ($V_{Aux}$) and a reference voltage and comprising a control terminal coupled to the output terminal of the sensor (S1) and an output terminal coupled to the supply voltage ($V_{Aux}$), wherein the first switch (T1) is configured to, in response to receiving the first signal via the control terminal, couple the output terminal of the first switch (T1) to the reference voltage to output a second signal for disabling the battery (160).

5. The storage processor (100) of claim 4, wherein the protection device (150) further comprises:

a first resistor (R4) connected between the supply voltage ($V_{Aux}$) and the output terminal of the first switch (T1) and configured to,
in response to the first switch (T1) being turned on, couple the output terminal of the first switch (T1) to the reference voltage to output the second signal, and
in response to the first switch (T1) being turned off, couple the output terminal of the first switch (T1) to the supply voltage ($V_{Aux}$) to output a third signal for enabling the battery (160).

6. The storage processor (100) of claim 5, wherein the sensor (S1) is a phototransistor coupled between the supply voltage ($V_{Aux}$) and the reference voltage.

7. The storage processor (100) of claim 6, wherein the protection device (150) further comprises:
a second resistor (R5) coupled between an output terminal of the phototransistor and the control terminal of the first switch (T1) and the reference voltage,
wherein the phototransistor turns on the first switch (T1) by coupling the control terminal of the first switch (T1) to the supply voltage ($V_{AUX}$) if the phototransistor is turned on.

8. The storage processor (100) of claim 4, further comprising:
a Baseboard Management Controller (BMC) (120) comprising an output terminal configured to, in response to determining that a capacity of the battery (160) is greater than a predetermined threshold, output a fifth signal with a high level; and
an AND gate (140) comprising:
a first input terminal (141) coupled to the output terminal of the first switch (T1);
a second input terminal (142) coupled to the output terminal of the BMC (120) and configured to receive the fifth signal; and
an output terminal (143) coupled to an enable port of the battery (160) to selectively enable or disable the battery (160).

9. The storage processor (100) of claim 2, wherein the light emitting device (D1) is a light-emitting diode.

10. The storage processor (100) of claim 4, wherein the first switch (T1) is a Metal-Oxide Semiconductor Field Effect Transistor (MOSFET).

11. A storage system, comprising:
a chassis;
one or more storage processors (100), wherein the one or more storage processors being disposed on the chassis; and
wherein each of the one or more storage processors comprising:
a housing (110) comprising a cover (112);
a main power supply input (130) configured to be connected to an external power source to supply power to the storage processor (100);
a battery (160) disposed within the housing (110) and configured to continue supplying power to the storage processor (100) in response to the main power supply input being cut off;
a protection device (150) disposed within the housing (110) and configured to, in response to determining that the cover (112) is opened, disable the battery (160) to supply power to the storage processor (100); and
a Baseboard Management Controller (BMC) (120) comprising an output terminal configured to output a fourth signal for selectively enabling or disabling the protection device (150), wherein the protection device (150) further comprises: a second switch (T2) having a control terminal coupled to the output terminal of the BMC (120) and an output terminal coupled to a light emitting device (D1) to selectively supply power to the light emitting device (D1) according to the fourth signal.

* * * * *